March 7, 1933.  G. O. WATSON  1,900,594
ELECTRIC SHIP PROPULSION
Filed Sept. 7, 1929  2 Sheets-Sheet 1
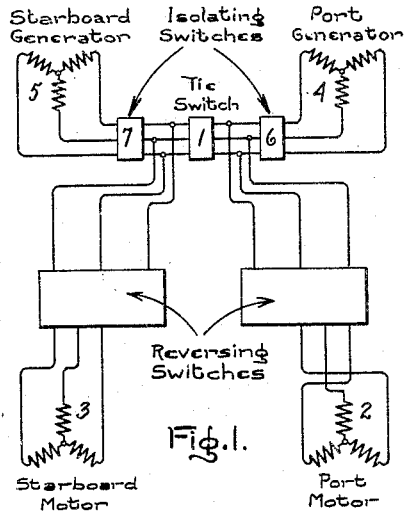
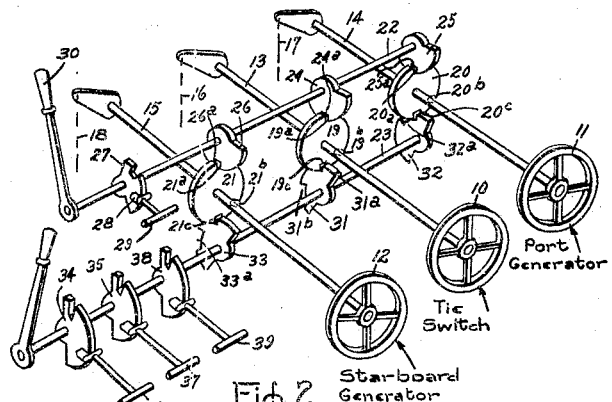
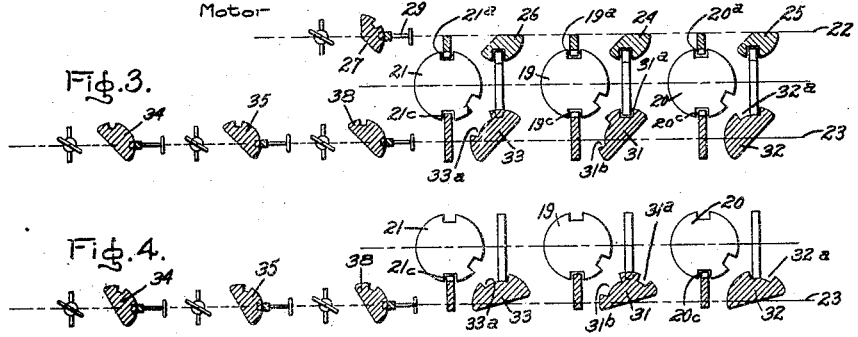
Inventor:
George O. Watson,
by Charles E. Tullar
His Attorney.

March 7, 1933.  G. O. WATSON  1,900,594
ELECTRIC SHIP PROPULSION
Filed Sept. 7, 1929   2 Sheets-Sheet 2
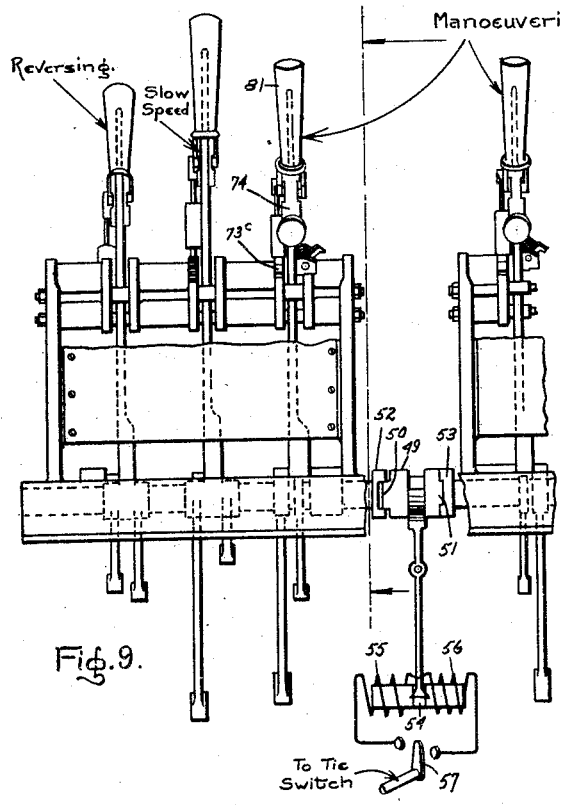
Fig. 9.
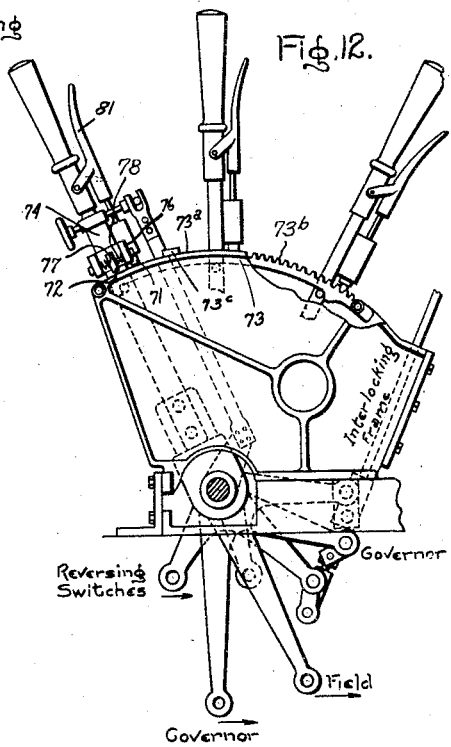
Fig. 12.
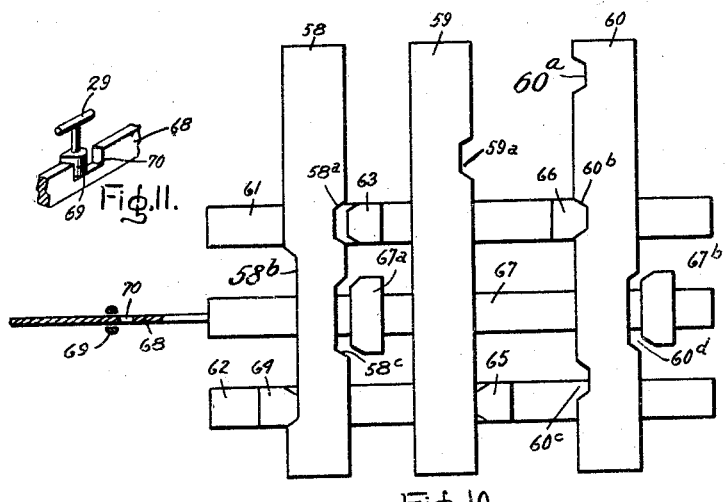
Fig. 11.
Fig. 10.
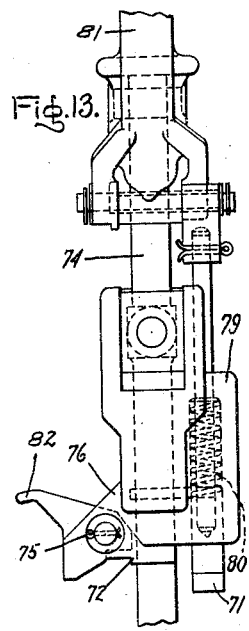
Fig. 13.
Inventor:
George O. Watson,
by Charles E. Tullar
His Attorney.

Patented Mar. 7, 1933

1,900,594

UNITED STATES PATENT OFFICE

GEORGE O. WATSON, OF RUGBY, ENGLAND, ASSIGNOR TO GENERAL ELECTRIC COMPANY, A CORPORATION OF NEW YORK

ELECTRIC SHIP PROPULSION

Application filed September 7, 1929, Serial No. 391,090, and in Great Britain September 7, 1928.

My invention relates to power systems and more particularly to control gear for electric ship propulsion systems where for example a plurality of propeller shafts are driven by motors supplied with current from a plurality of generators driven by a plurality of prime movers.

An object of my invention is to provide an improved system of interlocking whereby a desired sequence of operations must be performed in accordance with a predetermined pattern.

Further objects of my invention will appear from a consideration of the following description taken in connection with the accompanying drawings and its scope will be pointed out in the appended claims.

According to my invention, there is provided in combination with the switching mechanism, interlocking mechanism for the switches which renders it impossible to connect the generators in parallel.

Where two propelling motors and two generators are provided, the apparatus may comprise an isolating switch whereby one motor can be connected to its own generator, a second isolating switch whereby the other motor can be connected to its generator, and a tie switch which, when closed simultaneously with one of the isolating switches, serves to connect both motors to the generator associated with the isolating switch which is closed, interlocking mechanism being provided whereby when both isolating switches are free to close, the tie switch is locked open. In addition, means may be provided whereby when all the motors are connected in parallel to a single generator, the field control members are locked together so as to be incapable of separate operation. Preferably, such locking means is operated automatically by movement of the switches to connect the motors in parallel to one generator.

In addition, interlocking mechanism may also be provided whereby the switches for connecting each motor directly to its own generator (hereinafter referred to as isolators or isolating switches) cannot be closed unless the reversing and field control members are in the off position. Also the reversing member and the field control member may be interlocked so that the reversing member cannot be operated unless the field control member is in the off position. Again, if desired, further interlocking mechanism may be provided whereby the field control member cannot be operated unless the reversing member is definitely in the ahead position; the astern position or the off or neutral position.

Preferably, a third member is provided for controlling the speed of the motor when running slowly, interlocking mechanism being provided whereby this slow speed control member cannot be operated unless the field control member is in a position which will give the minimum speed setting of the governor and conversely, the field control member cannot be moved beyond the minimum speed within such range, unless the slow speed control member is in the position to give the maximum speed, which can be obtained by means of such slow speed lever. Conveniently, the field control member serves also to regulate the loading of the governor for the turbine driving the generator which supplies power to the motor or motors.

The control member for the field is conveniently in the form of a lever provided with a latch which is capable of being released and disengaged, in such a way that it remains disengaged without further attention from the operator. This arrangement renders the field lever capable of smart and rapid handling from notch to notch in both directions without overrunning. In one suitable arrangement, the latch is so mounted on the lever as to be capable of movement both in the direction of the longitudinal axis of the lever and also transversely with respect thereto. The latch is provided with biasing means tending to maintain it in a position intermediate the ends of its travel, while a fixed stop is also provided which cooperates with the latch, so that the lever can be moved smartly up to the stop, thus forcing the latch over to one end of its transverse travel. In addition actuating means are provided for moving the latch longitudinally with respect to the lever until it is clear of the stop, whereupon the biasing means suddenly displaces the latch transversely to its mid position, in which it remains resting on the raised surface of the stop after the actuating means has been released.

In order to heat the fields while the vessel is in port, switches are provided to enable the fields to be connected to a source of current for this purpose, interlocking means being provided whereby the switches for connecting the propelling motors to the source of power cannot be closed unless the heating switches are in their normal running position.

My invention may be carried out in various ways, but one arrangement according thereto is illustrated diagrammatically by way of example in the accompanying drawings, in which:

Fig. 1 is a diagrammatic representation of the electrical circuits of a system in which interlocking mechanism according to my invention may be used.

Fig. 2 illustrates in perspective the switch operating mechanism, together with the interlocks therefor, for a system such as shown in Fig. 1 where two propelling motors and two generators are used.

Fig. 3 shows the interlocking mechanism of Fig. 2 in the position which it occupies when the tie switch and the port isolator are free to close, the starboard isolator being locked open.

Fig. 4 shows the interlocking mechanism of Fig. 2 in the position which allows either or both isolators to close, the tie switch being locked open.

Fig. 5 shows the interlocking mechanism of Fig. 2 in the position which allows the tie switch and the starboard isolator to close, the port isolator being locked open.

Fig. 6 shows the interlocking mechanism of Fig. 2 in the position in which both isolators are locked open.

Fig. 7 shows the heating switches and interlocks associated therewith.

Fig. 8 shows in further details the locking arrangement for the doors of the heating switch cubicle.

Fig. 9 illustrates the arrangement of the control levers and the clutch mechanism for locking together the field control levers for the port and starboard motors.

Fig. 10 shows the interlocking mechanism for the field control lever, the slow speed control lever and the reversing lever.

Fig. 11 illustrates the key for locking the mechanism illustrated in Fig. 10.

Fig. 12 illustrates a side view of the levers of Fig. 9 taken along section A—A' of that figure and indicates the location of the interlock frame, the mechanism of which is shown in Fig. 10, and Fig. 13 shows a side view of the latches associated with the field control members shown in Figs. 9 and 12.

Referring to Fig. 1, the switchgear comprises three switches of which the center one 1, which may be referred to as the tie switch, serves to connect both motors 2 and 3 to one or the other of the two generators 4 and 5 when closed simultaneously with one or the other of the isolator switches 6 and 7, while the two outer switches respectively serve to connect the port and starboard motors separately to their respective generators. These two outer switches may be referred to as the port and starboard isolators. Each of these switches is operated by a handwheel, the tie switch handwheel being indicated at 10 in Fig. 2, while the port and starboard switch operating wheels are indicated at 11 and 12 respectively. The handwheels are secured to operating shafts or spindles 13, 14 and 15, which are connected to the switches 1, 6 and 7 through rods 16, 17 and 18. Each switch operating shaft has secured to it a locking disc 19, 20 and 21. These locking discs are of the same size and each is provided with three notches, of which the size and angular spacing are the same in the case of each disc. The notches in the center disc are indicated at 19a, 19b, 19c, those in the port disc at 20a, 20b, 20c, while those in the starboard disc are shown at 21a, 21b, 21c.

Running transversely across the three rods 16, 17 and 18 are two shafts 22 and 23, one disposed above the operating shafts while the other is disposed beneath them. On the upper transverse shaft 22 are mounted three locking segments 24, 25 and 26, provided with notches 24a, 25a and 26a with which the discs 19, 20 and 21 are respectively adapted to cooperate. The notches 24a, 25a and 26a are in alignment with one another, i. e. their angular spacing from any given radius is the same for each notch. The purpose of the locking segments 24, 25 and 26 is to provide means whereby the operating shafts 13, 14 and 15 for both isolating switches and the tie switch may be locked either off or on, unless the field control and reversing levers are in their respective off positions. To this end, the shaft 22 is provided at its left hand with a lock from which the key cannot be removed unless the mechanism is in the locked condition. A lock such as shown in U. S. Letters Patent to J. H. Castell No. 1,458,520 of June 12, 1923, may be used. In the present instance, the lock comprises a notched segment 27 having a bridge piece 28 mounted in a casing which is not shown in the figure. The bridge piece 28 is fixed except as regards rotary motion and can only rotate when the shaft 22 has been turned to bring the notch in the disc 27 into coincidence with the member 28. The member 28 can only be turned by means of the key 29 and the latter is so formed that it cannot be removed from the casing unless the bridge piece 28 has been turned in the notch so as to lock the shaft 22 against rotation. This same key 29 is also used to lock the field control lever and reversing lever locking mechanism in the position in which this mechanism occupies when both levers are locked in the off position. This mechanism will be described later with reference to Figs. 10 and 11. Thus the key 29 cannot be used to unlock the lever gear unless the shaft 22 is in the position in which the segments 24, 25 and 26 lock the switch operating shafts 13, 14 and 15, either in the open position in notches 19a, 20a and 21a, or in the closed positions in notches 19b, 20b and 21b; similarly the key cannot be used to unlock the shaft 22 unless the lever gear is first locked. This arrangement renders it impossible for the isolators or for the switch to be changed unless both the field circuits and reversing switches are open.

As shown in Fig. 2, the operating shafts 13, 14 and 15 are shown in the open position, but are not locked. In order to lock them, the selector lever 30 would have to be turned in the clockwise direction until the notch in segment 27 coincided with the bridge piece 28, thereby freeing the key and locking the spindles 13, 14 and 15.

The lower transverse shaft 23 serves to provide an interlock between the three operating shafts 13, 14 and 15 themselves. To this end, the shaft 23 carries three segments 31, 32 and 33. The central segment 31 is provided with two notches 31a and 31b of which the notch 31a is of such a width that the disc 19 can pass freely through it without allowing any free movement to the segment 31. The notch 31b on the other hand is wider, so that even when the disc 19 is in engagement with it, the segment 31 can still turn to a limited extent. The segment 32 which cooperates with the locking disc 20 for the port switch operating spindle 14 is provided with only one notch 32a which is relatively wide, so as to allow free movement of the segment 32 within limits when the disc 20 is in engagement with the notch. The segment 33 which cooperates with the disc 21 is provided with a relatively wide notch 33a in a similar manner to the segments 32.

The angular spacing of the notches 31a, 31b, 32a and 33a is clearly seen from Figs. 3, 4, 5 and 6, which show the shaft 23 in four different angular positions, giving four different conditions of the interlocking mechanism. It will be understood that in Figs. 3, 4, 5 and 6, the segments are shown in vertical section, the corresponding cross sectional elevation being shown to the right of each vertical section.

Considering Fig. 3, it will be seen that the disc 21 is locked owing to the fact that the disc 33 is in engagement with the notch 21c. The discs 19 and 20 on the other hand are free since, in the case of the former, the notch 19c is coincident with the notch 31a while in the case of the latter, the notches 20c and 32a are coincident. Hence, with the shaft 23 in this position, it is possible to connect the port generator to both motors by closing the tie switch and the port isolating switch.

In Fig. 3 there is also shown the upper transverse shaft 22 together with its segments 24, 25 and 26 in the positions corresponding to those which they occupy in Fig. 2.

Turning to Fig. 4, it can be seen that with the shaft 23 in this position, the disc 19 is locked while the discs 20 and 21 are free. Hence, either or both motors can be separately connected to their respective generators by closing either or both the isolating switches. It is not possible, however, to close the tie switch.

In Fig. 5, the disc 20 is locked while the discs 19 and 21 are free. Hence, both motors can be connected to the starboard generator by closing the starboard isolating switch and the tie switch. The port isolating switch cannot be closed.

Lastly, Fig. 6 shows the position in which the discs 20 and 21 are both locked, and consequently neither isolating switch can be closed. The tie switch, it is true, can be closed but will have no effect without one of the isolating switches. In this position, therefore, it is impossible to connect either motor to either generator in any way whatever.

The three switches 1, 6 and 7 are mounted within cubicles and it is desirable that the doors of these should be locked before the switches are made alive. To this end two locks 34 and 35, similar to the lock 27, 28 on shaft 22 are provided on the shaft 23 (see Figs. 2–6). These locks are operated by keys 36 and 37 respectively, of which the key 36 also serves to lock the starboard switch cubicle while the key 37 locks the port switch cubicle, the keys not being interchangeable. The locks 34 and 35 are so arranged on the shaft 23 that their keys cannot be removed unless the shaft 23 is in the position shown in Fig. 6, and the isolating switches consequently locked in the open position. Similarly, the locks on the cubicle doors are so arranged that the keys cannot be removed from them to unlock the isolating switches unless the doors themselves are locked.

A third lock 38 similar to the other two is also provided on the shaft 23 and is operated by a key 39. This same key 39 also serves to operate a lock on the door of the cubicle in which are located switches whereby a heating current may be passed through the field coils for the purpose of keeping them dry when in port. These switches are illustrated in Fig. 7 from which it will be seen that each switch is provided with a cross bar 40, which will foul corresponding projections 41 on the cubicle doors 42, if an attempt is made to close the latter with the switches in the downward or field heating position. As shown in Fig. 7, the switches are in the upper position for normal running. The lock 42a for the doors 42, and the lock 38 on the shaft 23 are so constructed that the common operating key 39 for both cannot be removed from either unless it is in the locked position. The key 39 cannot be rotated to the locked position unless the doors are closed. Hence, the heating switches must be in the normal position before the isolating or tie switches can be closed, and vice versa.

Fig. 8 shows the locking arrangement for the doors 42. A central fixed bar 43 is provided through which an eye 44 on the door is adapted to project when the door is closed. While the door is open, a pivoted member 45 prevents the bolt 46 from being raised, this member 45 being pushed out of the way against a spring 47 by the eye 44 when the door is closed. The bolt 46 can then be raised into engagement with the eye 44 to lock the door and can be locked in this position by means of the Castell lock 42a and the key 39. The bolt 46 is forked to engage simultaneously with the eyes in both doors. A knob 48 is provided for operating the bolt.

The arrangement of the controlling levers is shown in Figs. 9 and 12. There are six levers in all, three for the port motor and three for the starboard motor. They comprise as noted on the drawings a reversing lever, a slow speed lever and a maneuvering lever sometimes hereinafter referred to as a field lever because it controls the fields of its associated generator and motor.

The reversing levers control the reversing switches shown in Fig. 1 and have three positions, "ahead", "stop" and "astern". The slow speed levers control the governor for speeds, for example below one-fifth full speed, that is to say, for dead slow running. A device on the turbine (not shown) ensures sufficient steam to prevent the turbine stopping or reversing due to regeneration during maneuvering but it is up to the discretion of the operator to speed up the turbine by this lever if reversal is called for when running at dead slow speed. The two field levers are in the center of the group and are also used for varying the governor setting to obtain speed variations. The first half of their travel is for field switching; the remaining half of the travel being used to obtain the various speeds required on the turbine. The vertical position is the slow speed position, corresponding to say one-fifth maximum turbine speed. All of these levers are interlocked as described below in connection with Fig. 10. The interlock frame is shown to the right of the levers in the view shown in Fig. 12, Fig. 10 showing diagrammatically the arrangement of the locking bars.

When both motors are connected in parallel to a single generator, it is necessary to operate their field control levers simultaneously. Therefore, means are provided for locking these levers together automatically when the main switches are operated to effect the parallel connection of the motors. This automatic locking is conveniently effected by means of an electromagnetic clutch as illustrated in Fig. 9. This clutch comprises a movable member 49 adapted to slide longitudinally and having projecting end portions 50, 51. The portion 50 is longer than the portion 51, their relative lengths being such that by moving the member 49 over to the left in Fig. 8, the projection 51 can be made to disengage from the lever boss 53, while the projection 50 still remains in engagement with the lever boss 52. In order to effect the movement of the member 49 a solenoid is provided, having a core 54 and two windings 55 and 56 connected as shown to a switch 57 and a source of current. The switch 57 is mechanically connected to the tie switch in such a way that when the motors are connected in parallel the switch 57 is moved over to the left in Fig. 9, so as to energize the winding 55 and thereby move the member 49 to the right through the lever sstems shown. If, on the other hand, each motor is connected separately to its own generator, the tie switch will be open and the switch 57 is moved to the right and the member 49 to the left.

Instead of a double magnet, one magnet may be used in conjunction with a spring serving to return it to its inoperative position.

It is desirable that the main field control lever which also controls the turbine governor settings should not be capable of movement beyond a minimum speed position, say one-fifth full speed position unless the slow speed lever is in the position which will give the maximum speed within the slow speed range. Also it is necessary that the reversing lever should be incapable of movement unless the field lever is in the off position and, conversely, the field lever should not be capable of movement unless the reversing lever is in the off or neutral position, or definitely in one of the running positions, i. e. either ahead or astern.

In order to ensure these conditions, an interlocking mechanism as shown diagrammatically in Fig. 10 is provided. This mechanism comprises a bar 58 connected to the field control lever, a second bar 59 connected to the slow speed lever and a third bar 60 connected to the reversing lever as shown in Fig. 12. Running transversely across these three bars are two locking bars 61 and 62, all the bars being capable of sliding movement in the direction of their length. For the sake of simplicity, the frame within which the bars are mounted, is not shown in the drawings.

The bar 58 is provided with a notch 58a adapted to engage with a projection 63 on the locking bar 61 and with a notch 58b adapted to engage with a projection 64 on the locking bar 62. The notch 58b has a length several times that of the projection 64 in order to allow the bar 58 a certain amount of free movement within predetermined limits for a purpose which will be explained later. The bar 59 is provided with a single notch 59a adapted to engage with a projection 65 on the locking bar 62 and the bar 60 has three notches 60a, 60b and 60c, each adapted to engage when required, with a projection 66 on the locking bar 61. The mechanism as shown in Fig. 10 is in the position which it will occupy when all the levers are in the off position.

In this position, all the levers are free and any one of them can be moved. If, for example, it is desired to start the ship up in the ahead direction, the reversing lever is moved into the ahead position, thereby moving the bar 60 until the notch 60a comes opposite the projection 66. The initial movement of the bar 60 will cause the projection 66 to ride out of the notch 60b, thus displacing the locking bar 61 to the left in the figure and causing the projection 63 to enter the notch 58a in the bar 58 which is connected to the field control lever. It should be noted in this connection that the projections 63 and 66 are spaced apart on the bar 61, so that when the projection 66 is clear of the notch 60b, the projection 63 bears against the bottom of the notch 58a. By this means, the bar 58 and consequently the field lever is locked while the reversing lever is being moved from the neutral to the ahead position. As soon as the reversing lever has reached the ahead position, however, the field lever is free to move, since the ensuing movement of the bar 58 would displace the locking bar 61 to the right, causing the projection 66 to enter the notch 60a, thus locking the bar 60 and consequently the reversing lever against movement. A similar result would be obtained if the reversing lever were moved into the astern position, i. e. until the notch 60c came opposite the projection 66. It will further be noted that the bar 61 cannot slide to the left unless the notch 58a coincides with projection 63. This prevents movement of the bar 60, unless bar 58 and consequently the field lever is in the correct position, i. e. the off position.

Assuming that the reversing lever has been moved into the ahead position, the field lever can be moved until the bar 58 has traveled a distance equal to the length of the notch 58b, when it would be stopped by the projection 64 engaging with the end of the notch. The projection could not ride out of the notch owing to the fact that the projection 65 is bearing against the edge of the bar 59. The length of the notch 58b is equal to the travel of the bar 58 caused by moving the field control lever from the stop to the one-fifth full speed position. If it is desired to move the field lever beyond the one-fifth full speed position, then it is necessary to bring the slow speed lever to the position in which the notch 59a comes opposite to the projection 65. With the slow speed lever in this position, a speed equal to one-fifth full speed can be obtained, i. e. the maximum speed within the slow speed range. The projection 64 can then ride out of the notch 60b, while the projection 65 enters the notch 59a and locks the slow speed lever against movement until the field lever is brought back below the one-fifth speed position.

As already explained with reference to Figs. 2–6, it is desirable that the field control lever and the reversing lever shall be incapable of movement from their off positions, unless both the isolating switches are locked. To this end, a third transverse locking bar 67 is included in the mechanism shown in Fig. 10 and is provided with two projections 67a, 67b respectively adapted to engage with notches 58c and 60d, formed in the bars 58 and 60. The movement of bar 58 is such that notch 58c cannot coincide with projection 63. The locking bar 67 carries an extension 68 fitted with a suitable lock comprising a saddle shaped member 69 adapted to cooperate with a slot 70 and extension 68 (see Fig. 11). The member 69 is mounted in a casing (not shown) and can be turned by means of a key 29. As can be seen from the drawings, however, the member 69 can only be turned when the extension 68 has been displaced until the slot 70 coincides with the member 69, such movement of the extension 68 simultaneously causing the projections 67a and 67b to engage with their respective notches and thus lock the bars 58 and 60 in such a position that the field control and reversing levers are off. The arrangement of the lock is such that the key 29 cannot be removed unless the member 69 is turned in the notch 70, this operation, as is evident, serving to lock the bar 67 in the position which it occupies when the field control and reversing levers are in their off position. Once this locking operation has been accomplished, the key 29 can be removed to unlock the isolating switches as described with reference to Figs. 2–6. It will be appreciated that the same key is used for locking the isolating switches and for locking the mechanism shown in Fig. 10. Hence, this key is given the same reference numeral both in Figs. 2–6 and in Figs. 10 and 11.

The locking bar 67 is only necessary when it is desired to provide an interlock between the isolating switches and the field and reversing levers. If such an interlock is not required, then the bar 67 may be omitted together with the lock 69, 70 and the lock 38 shown in Figs. 2–6.

Each field control lever is preferably provided with a latch which is capable of being released and disengaged in such a way that it will remain disengaged without further attention from the operator. This latch is illustrated in Figs. 12 and 13, and comprises a latch member proper 72 adapted to cooperate with a quadrant 73. A second latch 71 of usual construction with the quadrant 73 in a manner to be explained later, is also provided and cooperates.

During field switching it is desirable that the maneuvering lever move over the quadrant 73 for a predetermined distance from the stop position without encountering resistance, but also that a pause or pauses be made in this movement at a predetermined point or points to allow for field discharges, to allow the motors to come up to speed, to allow for synchronizing the motors, etc. In order to provide for such pause or pauses at the desired point or points raised projectors are provided on the quadrant 73 to cooperate with the latch 72 on the maneuvering lever as more fully described below. Only one stop 73c is shown in Fig. 12.

In order to render it possible for the operator to bring the lever smartly up to the stop 73c and leave it there with the latch disengaged, the latch member 72 is pivoted on a pin 75 carried in a fork 76, secured to the lever 71. The latch 72 is so mounted on the pin 75 that it can slide longitudinally thereon and in order normally to maintain the pin in the central position, springs 77, 78 are provided between the member 72 and the arms of the fork 76. The latch 71 is adapted to slide longitudinally in a guide 79 and can be operated against a spring 80 by means of a handle 81 secured to the lever 74. In operation the lever 74 is moved smartly and without hesitation over the quadrant 73 until the latch 72 abuts against the stop 73c, thereby compressing the spring 77 so that the latch 72 is displaced to the left. The latch 72 is then raised above the stop 73c by means of a trigger 82 so that the spring 77 can return the latch 72 to the central position in which it rests on the top of the stop 73c, leaving the lever 74 free. After the necessary pause, the lever 74 is moved on until the toothed portion 73b of the quadrant is reached, with which the latch 71 cooperates in the ordinary way. When moved in the opposite direction, the spring 78 is compressed, the operation otherwise being similar.

The particular interlocks above described may be associated with various electrical arrangements for controlling the electrical equipment of the ship and with various types of governors for controlling the speed of the ship's prime movers.

While I have specifically described certain features of construction and methods of operation, it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An electric system comprising a generator, a motor, switch gear for connecting said generator and said motor, a source of heating current for the fields of said motor and said generator, switching means for connecting said fields to said source of heating current or to said switch gear, a cubicle for enclosing said switching means, a door for said cubicle, projections on said door for preventing the closure of said door when said switching means completes a circuit from said heating source to said field, key-operated locking mechanism for said cubicle from which the key cannot be withdrawn unless said door is closed and locked, key-operated locking mechanism for said switch gear from which the key cannot be withdrawn unless said switch gear for connecting said generator and motor is locked in its open position, and one key for operating both of said key-operated locking mechanisms.

2. In an electric system, a plurality of motors, a plurality of generators, isolating switches for connecting each motor to its generator, tie switches for connecting a plurality of motors to a single generator, field control means for said generators and motors, means for reversing said motors, key-operated locking mechanism for said isolating switches and for said tie switches from which the key cannot be withdrawn unless said switches are locked open or closed, key-operated locking mechanism for said field control means and for said reversing means from which the key cannot be withdrawn unless said field control means is locked in the "off" position and said reversing means is locked in the "ahead", "astern" or "off" position and a common key for operating both of said key-operated locking mechanisms to ensure that the isolating and tie switch mechanisms cannot be unlocked simultaneously with the reversing means and field control means.

3. In a ship propulsion system, a prime mover, a main speed control means for said prime mover arranged to control said prime mover throughout its complete range of speed, an auxiliary speed control means arranged for controlling the speed of said prime mover at very slow speeds, and means for locking said slow speed control means until said main speed control means is in a position which will give the minimum speed setting for said prime mover and for locking said main speed control means against movement beyond its slow speed position until said slow speed control means is in a position to give its maximum speed setting for said prime mover.

4. In an electric ship propulsion system, a motor, a generator, a prime mover for said generator, a field control member for said geneator and motor arranged to control also the speed of said prime mover throughout its complete range of speed, a reversing member for said motor, a low speed control member for said prime mover and interlocking mechanism for preventing movement of said reversing lever until said field control member is in its "off" position, movement of said field control member until said reversing member is in the "ahead", "astern" or "off" position, movement of said low speed lever until said field control member is in a position which will give its minimum speed setting and movement of said field control member beyond its minimum speed position until said low speed control member is in a position to give its maximum speed.

5. An electric system comprising a plurality of dynamo electric machines, switching means for connecting said machines, auxiliary switching means associated with one of said dynamo electric machines, key operated locking mechanism for said auxiliary switching means from which the key cannot be drawn unless said auxiliary switching means is locked in a predetermined position, key operated locking mechanism for said switching means for connecting said dynamo electric machines from which the key cannot be withdrawn unless said switching means is in a predetermined position, and one key for operating both of said key operated mechanisms.

In witness whereof, I have hereunto set my hand this twenty-first day of August, 1929.

GEORGE O. WATSON.